UNITED STATES PATENT OFFICE.

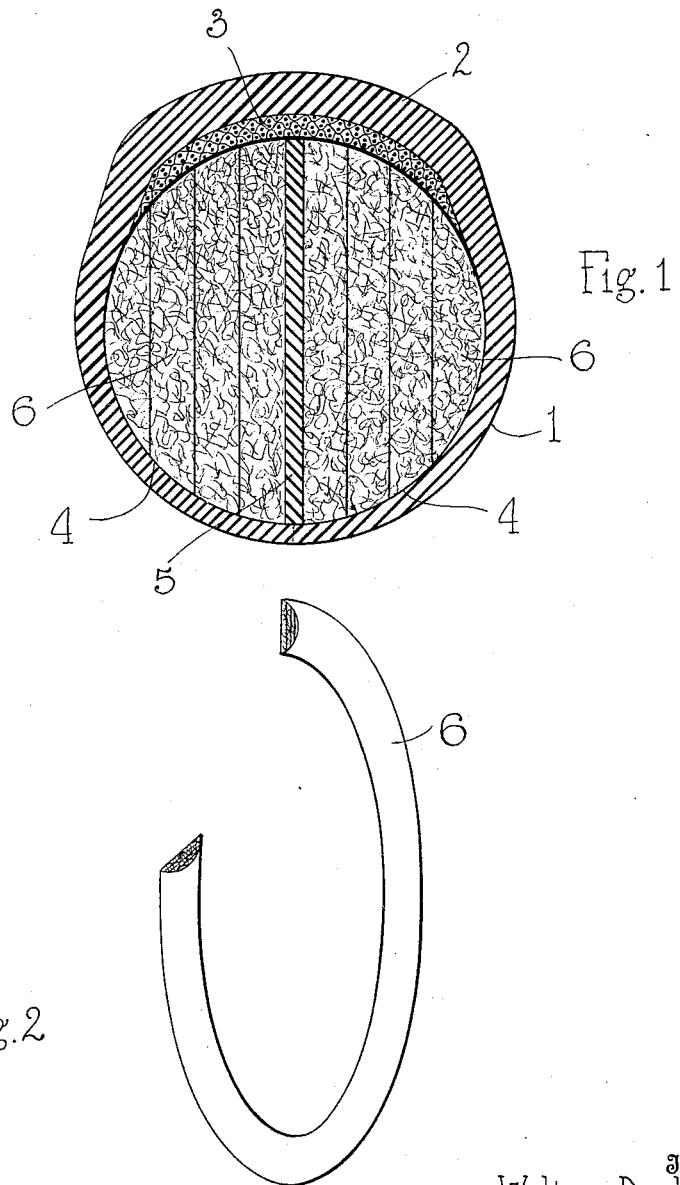

WALTER DRABOLD AND AUGUSTUS P. MOTT, OF DETROIT, MICHIGAN.

TIRE.

1,104,783.  Specification of Letters Patent.  Patented July 28, 1914.

Application filed March 26, 1914. Serial No. 827,347.

*To all whom it may concern:*

Be it known that we, WALTER DRABOLD and AUGUSTUS P. MOTT, citizens of the United States of America, residing at Detroit, in the county of Wayne and State of Michigan, have invented certain new and useful Improvements in Tires, of which the following is a specification, reference being had therein to the accompanying drawings.

This invention relates to tires, and the objects of our invention are, first, to provide a tire that can be advantageously used in connection with bicycles and small vehicles; second, to provide a tire possessing the resiliency of a pneumatic tire without resorting to the use of air as a cushioning medium; third, to provide a puncture-proof tire which will not be detrimentally affected by stone bruises, cuts, or injury that would ordinarily cause the deflation of a pneumatic tire, and fourth, to accomplish the above results by a durable tire that is inexpensive to manufacture and highly efficient for the purposes for which it is intended.

With the above and other objects in view, the invention resides in the novel construction and arrangement of parts to be hereinafter specifically described and then claimed, and reference will now be had to the drawing wherein—

Figure 1 is a cross sectional view of a tire in accordance with our invention, and Fig. 2 is a perspective view of a portion of a yieldable filler of the tire.

In the drawing 1 denotes a tube having a shoe or tread 2 and embedded in the inner side of the shoe or tread 2 are layers of fabric 3. The tube 1 is divided into two circumferential compartments 4 by a central vertical partition 5 and filling the compartments 4 are yieldable fillers 6. The tube 1, which has the shape of an ordinary tire, is preferably made of rubber or a composition of rubber and the central partition 5 is made of a similar material. The fillers 6 are made of felt pressed and shaped to form rings that are semicircular in cross section, said rings having the flat faces thereof engaging the sides of the partition 5. In some instances, the fillers 6 can be laminated or built up of a plurality of layers.

In the manufacture of the tire, it is preferable to assemble all of the parts thereof and then thoroughly vulcanize the entire structure, whereby the edges of the central partition 5 will become integral with the tube 1. The partition 5 serves as a binder between the walls of the tube and to a certain extent resists compression of the shoe or tread 2. With the partition 5 extending circumferentially of the tire the sides thereof are braced by the fillers 6, but either of said fillers can yield should the compression upon the shoe or tread 2 be so great as to distort or flex the partition toward one or the other of the fillers.

We would have it understood that our invention is susceptible to such changes as fall within the scope of the appended claim.

What we claim is:

A tire comprising a tube having a tread, layers of fabric embedded in the inner side of the tread of said tube, a central vertical resilient partition throughout the length of said tube and dividing the tube into compartments, and yieldable laminated fillers of felt completely filling the compartments of said tube and arranged in parallelism with sides of said partition.

In testimony whereof we affix our signatures in presence of two witnesses.

WALTER DRABOLD.
AUGUSTUS P. MOTT.

Witnesses:
ANNA M. DORR,
KARL H. BUTLER.

---

Copies of this patent may be obtained for five cents each, by addressing the "Commissioner of Patents, Washington, D. C."